United States Patent
Hashiguchi

(10) Patent No.: US 11,419,193 B2
(45) Date of Patent: Aug. 16, 2022

(54) MOVING BODY

(71) Applicant: TOYOTA JIDOSHA KABUSHIKI KAISHA, Toyota (JP)

(72) Inventor: Yuka Hashiguchi, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 869 days.

(21) Appl. No.: 16/263,019

(22) Filed: Jan. 31, 2019

(65) Prior Publication Data

US 2019/0291278 A1     Sep. 26, 2019

(30) Foreign Application Priority Data

Mar. 23, 2018 (JP) .............................. JP2018-055959

(51) Int. Cl.
| | |
|---|---|
| *B60Q 1/02* | (2006.01) |
| *B60Q 1/26* | (2006.01) |
| *B60Q 1/30* | (2006.01) |
| *B60Q 1/34* | (2006.01) |
| *H05B 45/10* | (2020.01) |
| *H05B 47/105* | (2020.01) |
| *H05B 47/155* | (2020.01) |
| *H05B 45/20* | (2020.01) |
| *B25J 5/00* | (2006.01) |
| *B25J 11/00* | (2006.01) |
| *B25J 19/06* | (2006.01) |

(Continued)

(52) U.S. Cl.
CPC ............ *H05B 45/20* (2020.01); *B25J 5/007* (2013.01); *B25J 11/0015* (2013.01); *B25J 19/06* (2013.01); *B60Q 1/02* (2013.01); *B60Q 1/2607* (2013.01); *B60Q 1/30* (2013.01); *B60Q 1/346* (2013.01); *F21S 2/00* (2013.01); *H05B 45/10* (2020.01); *H05B 47/105* (2020.01); *H05B 47/155* (2020.01); *F21Y 2115/10* (2016.08)

(58) Field of Classification Search
None
See application file for complete search history.

(56) References Cited

U.S. PATENT DOCUMENTS

| | | | |
|---|---|---|---|
| 2016/0059770 A1 | 3/2016 | Ji et al. | |
| 2018/0050634 A1* | 2/2018 | White | G05D 1/0016 |
| 2018/0284786 A1* | 10/2018 | Moshkina-Martinson | G05D 1/0219 |

FOREIGN PATENT DOCUMENTS

| | | |
|---|---|---|
| CN | 205912286 U | 1/2017 |
| CN | 107076557 A | 8/2017 |
| CN | 206910290 U | 1/2018 |

(Continued)

*Primary Examiner* — Anh Q Tran
(74) *Attorney, Agent, or Firm* — Oblon, McClelland, Maier & Neustadt, L.L.P.

(57) ABSTRACT

A moving body configured to move autonomously includes: a light emitting device configured to emit light in radial directions with respect to a vertical axis of the moving body; an acquisition unit configured to acquire a moving direction of the moving body; and a light-emitting control unit configured to make the light emitting device emit light using luminous colors previously associated with each direction of the radial directions with reference to the moving direction acquired by the acquisition unit, in which the light emitting device is installed so as to be able to emit light with at least one of the luminous colors within an arbitrary range of 180° in the radial directions.

8 Claims, 8 Drawing Sheets

(51) Int. Cl.
*F21S 2/00* (2016.01)
*F21Y 115/10* (2016.01)

(56) References Cited

FOREIGN PATENT DOCUMENTS

| | | |
|---|---|---|
| JP | 7-46710 A | 2/1995 |
| JP | 2011-204145 | 10/2011 |
| JP | 2013-086234 | 5/2013 |
| JP | 2017-35916 A | 2/2017 |
| WO | WO 2017/038883 A1 | 3/2017 |
| WO | WO 2018/034686 A1 | 2/2018 |
| WO | WO-2019224161 A1 * | 11/2019 .............. B60P 3/007 |

* cited by examiner

MOVING BODY

CROSS REFERENCE TO RELATED APPLICATIONS

This application is based upon and claims the benefit of priority from Japanese patent application No. 2018-55959, filed on Mar. 23, 2018, the disclosure of which is incorporated herein in its entirety by reference.

BACKGROUND

The present disclosure relates to a moving body that moves autonomously.

A moving robot including a display function for making people in the surrounding area recognize a moving direction is known. Such a moving robot includes, for example, a display device that illuminates an LED lamp of a moving direction, and changes flickering of the LED lamp toward the moving direction (for example, see Japanese Unexamined Patent Application Publication No. 2011-204145).

SUMMARY

Merely by illuminating an LED of a moving direction when a moving body moves, people in the surrounding area cannot visually recognize the illuminated LED depending on their standing positions and thereby cannot determine which direction the moving body moves. Even when an LED flickers toward the moving direction, if they cannot visually recognize the LED flickering in a stream toward the moving direction, they still cannot determine which direction the moving body moves.

The present disclosure provides a technique in which in an environment where a moving body moves autonomously, people in the surrounding area can recognize at a glance the moving direction of the moving body.

A first exemplary aspect is a moving body configured to move autonomously includes: a light emitting device configured to emit light in radial directions with respect to a vertical axis of the moving body; an acquisition unit configured to acquire a moving direction of the moving body; and a light-emitting control unit configured to make the light emitting device emit light with luminous colors previously associated with each direction of the radial directions with reference to the moving direction acquired by the acquisition unit, in which the light emitting device is installed so as to be able to emit light with at least one of the luminous colors within an arbitrary range of 180° in the radial directions. When a light emitting device is installed in such a manner and emits light with the luminous colors determined with respect to the moving direction of the moving body, people who are present on a moving plane where the moving body moves (hereinafter referred to as "surrounding observers") can recognize at least one of the luminous colors and thereby can recognize the moving direction of the moving body regardless of their standing positions.

Further, the above light emitting device preferably includes a plurality of light emitting parts, and each of the plurality of light emitting parts is disposed in an outer peripheral part of the moving body. When the plurality of light-emitting parts are disposed in such a manner, the above-described emitting control can be performed by a simple light emitting device. Alternatively, the light emitting device may include a light emitting part, and a driving device configured to successively direct light from the light emitting part toward the radial directions. Even with such a configuration, the above-described emitting control can be performed by a small number of the light emitting parts.

Further, the luminous colors preferably include at least; a first specified color associated with the moving direction; a second specified color associated with a direction opposite to the moving direction; a third specified color associated with a right side direction with respect to the moving direction; and a fourth specified color associated with a left side direction with respect to the moving direction. Considering a relative relation between a visibility of the surrounding observers and the moving body, it is possible to make the observers recognize at least an approximate moving direction by allowing at least one of the above four colors to be visually recognized.

Further, the above acquisition unit may also acquire a moving speed of the moving body, and the light-emitting control unit may change at least one of saturation and brightness of the luminous colors according to the moving speed acquired by the acquisition unit. With such a configuration, the surrounding observers can also recognize not only the moving direction of the moving body, but also the moving speed thereof.

Further, when the moving body is at a standstill, the light-emitting control unit may make the light emitting device emit light with the luminous colors with reference to the posture of the moving body. The surrounding observers can easily recognize that the moving body is at a standstill by visually recognizing it. Therefore, when the moving body is at a standstill, in association with the posture of the moving body facing the front direction which is assumed from, for example, a direction of a dummy head or a position at which an arm is attached, the light-emitting control unit makes the light emitting device emit light in the same manner that the luminous colors associated with the moving direction are emitted. When the light emitting device is made to emit light while the moving body is at a standstill as described above, the surrounding observers conceptually recognize both the front direction and the moving direction of the moving body as the "front". Therefore, it becomes easy for them to intuitively understand which direction the luminous color that they are visually recognizing indicates with respect to the moving direction of the moving body.

Further, in the above moving body, the light emitting device may include a first light emitting device and a second light emitting device, and when the moving body is moving, the light-emitting control unit may make the first light emitting device emit light with luminous colors previously associated with each direction of the radial directions with respect to the moving direction acquired by the acquisition unit, and when the moving body is at a standstill, the light-emitting control unit may make the second light emitting device emit light with the luminous colors with respect to the posture of the moving body. As described above, the two light emitting devices are respectively used as one indicating the moving direction and one indicating the posture of the moving body, and thereby the surrounding observers can easily determine whether the luminous color that they are visually recognizing indicates the moving direction or the posture of the moving body.

Note that when light emission between the first and the second light emitting devices is switched, the light-emitting control unit may set a period during which both of the devices emit light at the time of switching. By performing the light emitting control as described above, the surrounding observers can recognize whether a moving body which is moving becomes to a standstill or a moving body which is at a standstill starts to move.

According to the present disclosure, it is possible to provide a technique in which in an environment where a moving body moves autonomously, the surrounding observers can recognize at a glance a moving direction of the moving body.

The above and other objects, features and advantages of the present disclosure will become more fully understood from the detailed description given hereinbelow and the accompanying drawings which are given by way of illustration only, and thus are not to be considered as limiting the present disclosure.

DESCRIPTION OF EMBODIMENTS

Figure 1:
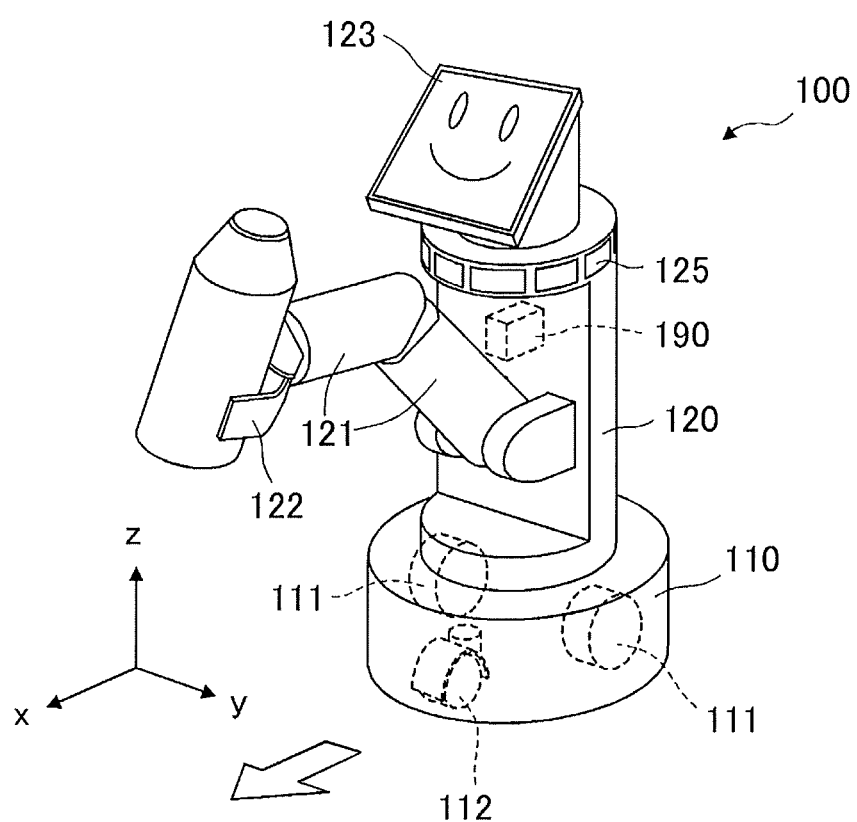
FIG. 1 is an external perspective view showing a moving robot according to a first example in an embodiment.

FIG. 1 is an external perspective view showing a moving robot 100 according to a first example in this embodiment. The moving robot 100 is an example of a moving body. The moving robot 100 is mainly composed of a carriage unit 110 and a main unit 120.

The carriage unit 110 supports two drive wheels 111 and one caster 112, each of which is grounded on a travel surface, in a cylindrical case. The two drive wheels 111 are disposed so that the centers of their rotation axes coincide with each other. Each drive wheel 111 is independently and rotationally driven by using a motor (not shown). The caster 112 is a driven wheel and provided so that a rotating shaft extending in a vertical direction from the carriage unit 110 pivotally supports the wheel apart from the rotation axis of the wheel. Further, the caster 112 follows the carriage unit 110 in accordance with a moving direction thereof.

For example, the moving robot 100 goes straight when the two drive wheels 111 are rotated at the same speed in the same direction, and rotates around the vertical axis passing through the center of two drive wheels 111 of the carriage unit 110 when the two drive wheels 111 are rotated at the same speed in the reverse direction. Thus, the moving robot 100 can move parallel to and rotate in an arbitrary direction by controlling a turning direction and a turning speed of each of the two drive wheels 111.

The main unit 120 mainly includes a grasping unit constituted by an arm 121 and a hand 122, a display panel 123, and a light emitting unit 125. The arm 121 and the hand 122 are driven by a motor (not shown), and grasp various objects in a controlled posture. FIG. 1 shows a state where the moving robot 100 grasps a container as an example of an object to be transferred. The main unit 120 can rotate around the vertical axis with respect to the carriage unit 110 by a driving force of the motor (not shown). Accordingly, the moving robot 100 can move in an arbitrary direction while maintaining a posture in which the grasping unit grasps an object to be transferred and faces a specific direction.

The display panel 123 is, for example, a liquid-crystal panel, and displays a face of a character and shows information on the moving robot 100. When the display panel 123 displays a face of a character, the impression that the display panel 123 is a dummy face is given to the surrounding observers. Further, the display panel 123 includes a touch panel on the display surface and can receive an input instruction from a user.

The light emitting unit 125 is a light emitting device including a plurality of light emitting parts, and the light emitting parts are disposed on an annular outer peripheral part of the upper part of the main unit 120 so as to emit light in the radial directions with respect to the vertical axis. The specific configuration will be described later. Further, a control unit 190 is provided in the main unit 120. The control unit 190 includes a control unit, a memory and the like, which will be described later. Note that in the following description, as shown in the drawings, a direction in which the moving robot 100 moves is defined as an x-axis (a forward moving direction is a positive direction), a vertical axis direction with respect to a moving plane is defined as a z-axis (an upward direction is a positive direction), and a direction orthogonal to the x-axis and the z-axis is defined as a y-axis.

Figure 2:
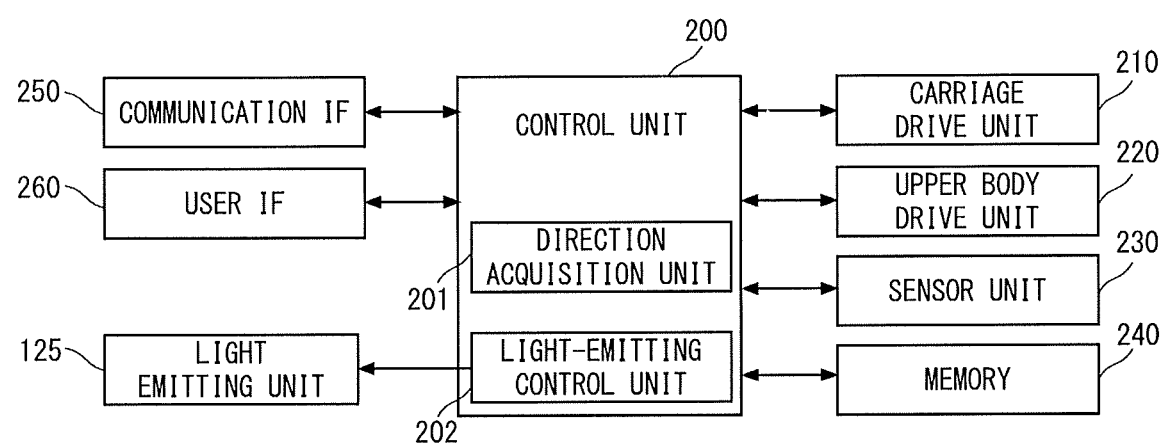
FIG. 2 is a control block diagram of the moving robot.

FIG. 2 is a control block diagram of the moving robot 100. A control unit 200, for example, is a CPU, and is housed in the control unit 190 of the main unit 120. A carriage drive unit 210 includes a drive circuit and a motor for driving the drive wheels 111. The control unit 200 sends a drive signal to the carriage drive unit 210 to control a rotation of the drive wheels 111. Further, the control unit 200 receives a feedback signal of an encoder or the like from the carriage drive unit 210, and recognizes a moving direction of the carriage.

An upper body drive unit 220 includes a grasping unit including an arm 121 and a hand 122, and a drive circuit and a motor for driving the main unit 120. The control unit 200 sends a drive signal to the upper body drive unit 220 to control grasping, and a rotation of the main unit 120. Further, the control unit 200 receives a feedback signal of an encoder or the like from the upper body drive unit 220, and recognizes a state of the grasping unit and a direction of the main unit 120.

A sensor unit 230 includes various sensors for detecting obstacles and recognizing an object to be transferred during moving, and is disposed in the carriage unit 110 and the main unit 120 in a distributed manner. The control unit 200 sends a control signal to the sensor unit 230 to drive various sensors and obtains output signals from them.

A memory 240 is a nonvolatile storage medium, and for example, a solid state drive is used. The memory 240 stores various parameter values, functions, lookup tables and the like which are used for controlling the moving robot 100 in addition to a control program. The memory 240 may store an environmental map representing an environment in which the moving robot 100 travels autonomously.

A communication IF 250 is a communication interface for transmitting and receiving various information items and control signals to and from external devices and other autonomous moving robots according to control of the control unit 200. The communication IF 250 is, for example, a wireless LAN unit. The communication IF 250 may receive an environmental map previously created by external devices for moving autonomously. Further, it may receive a control signal from a server for moving autonomously. A user IF 260 is a display panel 123 or, for example, a speaker or the like that utters synthesized voices, and is a user interface for providing information to a user and receiving an instruction from the user according to control of the control unit 200. The control unit 200 may receive a path for moving autonomously from a user through the user IF 260. The light emitting unit 125 includes a plurality of light emitting parts as described above, and it turns off light or emits light with specific luminous colors in response to a control signal from a light-emitting control unit 202, which will be described later.

The control unit 200 serves as a functional calculating unit for performing various calculations related to controls. A direction acquisition unit 201 recognizes a moving direction calculated based on an environmental map, a moving direction instructed by a user, or a feedback signal received from the carriage drive unit 210 to acquire and recognize the current moving direction of the moving robot 100. Further, the direction acquisition unit 201 also acquires and recognizes the current direction of the main unit 120 from a feedback signal received from the upper body drive unit 220. Although the details will be described later, it will be mentioned here that the light-emitting control unit 202 transmits a control signal for turning off and emitting the light emitting parts of the light emitting unit 125 with specific luminous colors based on a moving direction of the moving robot 100 and information on a direction of the main unit 120 to the light emitting unit 125, which are received from the direction acquisition unit 201.

Figure 3:
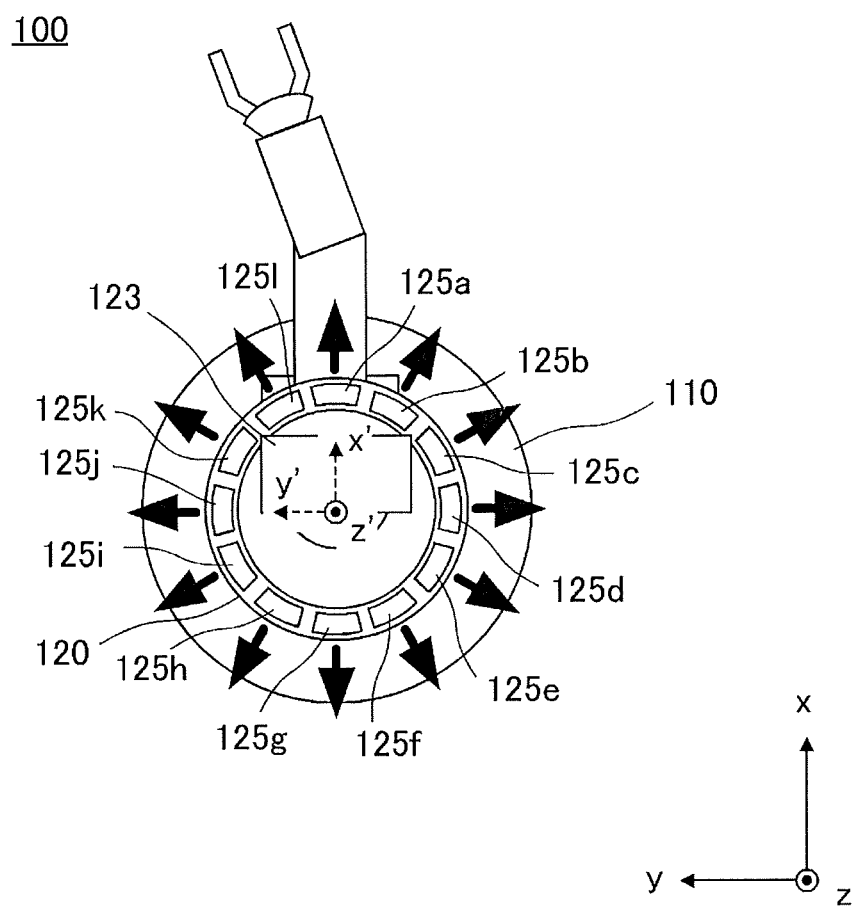
FIG. 3 is a conceptual diagram for explaining an installation and a function of a light emitting unit.

FIG. 3 is a conceptual diagram for explaining an installation and a function of a light emitting unit 125. Specifically, FIG. 3 shows a state where the moving robot 100 is observed from above, in particular, the moving robot 100 is schematically shown to facilitate understanding of an arrangement of each light emitting part of the light emitting unit 125.

The light emitting unit 125 includes twelve light emitting parts from a first light emitting part 125*a* to a twelfth light emitting part 125*l*, and the light emitting parts are disposed along an annular outer peripheral part of the upper part of the main unit 120. As described above, while the main unit 120 can rotate around the vertical axis with respect to the carriage unit 110, it is defined here that as a coordinate system of the main unit 120, a vertical axis is a z'-axis (the same axis as the z-axis), a direction orthogonal to the z'-axis in which the display panel 123 faces is an x'-axis, and a direction orthogonal to the z'-axis and the x'-axis is a y'-axis. The twelve light emitting parts are respectively disposed at equal intervals in the radial direction with respect to the z'-axis. For example, with respect to the first light-emitting unit 125*a* facing the front, the fourth light-emitting unit 125*d* faces a direction rotated clockwise by 90°, the seventh light-emitting unit 125*g* faces the opposite direction, and the tenth light-emitting unit 125*j* faces a direction rotated counterclockwise by 90°. Light emitted from each of the light emitting parts diffuses while having a directivity in each direction indicated by the respective arrows as shown in FIG. 3.

Each of the light emitting parts can emit light by switching at least twelve colors which will be described later. Each of the light emitting parts is composed of, for example, three-color (RGB) LEDs, and implements specific luminous colors by adjusting a brightness ratio of each LED. Each of the light emitting parts determines as to whether it emits light or turns off light, and what color is used when emitting light, in accordance with a control signal transmitted from the light emitting control unit 202. When the moving robot 100 moves, the light-emitting control unit 202 makes each light emitting part emit light with the luminous colors associated with each direction of the radial directions with reference to the moving direction of the moving robot (i.e., the moving direction of the carriage unit 110).

Figure 4:
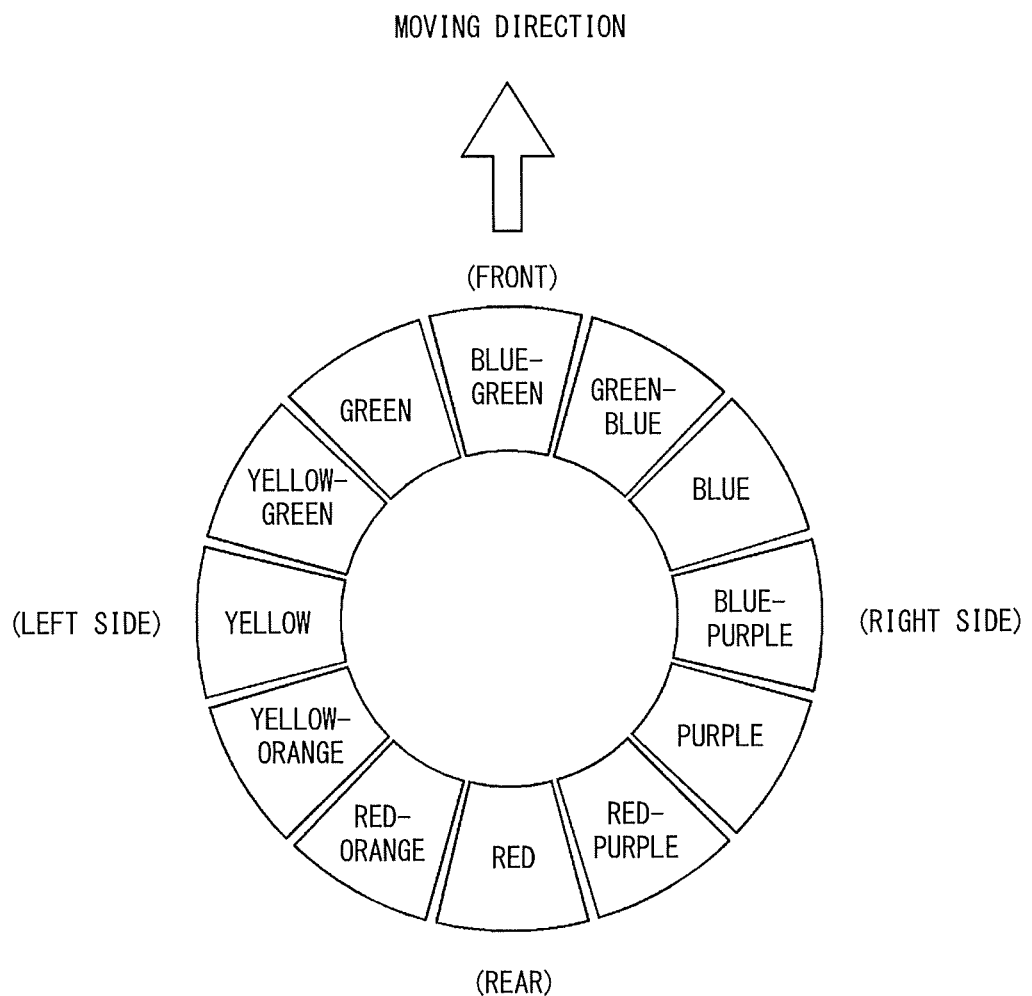
FIG. 4 shows a definition of luminous colors with respect to a moving direction.

FIG. 4 shows a definition of the luminous colors with respect to a moving direction of the moving robot 100. The luminous colors are defined annularly, and twelve colors are assigned clockwise when the moving direction is assumed to be the front. Specifically, as shown in FIG. 4, in a clockwise direction in which blue-green is assumed to be the front, green-blue, blue, blue-purple, purple, red-purple, red, red-orange, yellow-orange, yellow, yellow-green, and green are assigned in the order corresponding to the color order of the hue circle shown in the figure. At this time, with respect to the front, blue-purple is positioned at the right side, red is positioned at the rear side, and yellow is positioned at the left side.

The light-emitting control unit 202 determines the luminous colors corresponding to each of the light emitting parts of the light-emitting unit 125 according to the above definition, and makes them emit light. For example, when a moving direction of the moving robot 100 (i.e., the x-axis positive direction) is a direction rotated clockwise by 20° with respect to the x'-axis positive direction, the light-emitting control unit 202 makes the second light-emitting part 125*b* disposed in a range of between 15° to 45° emit light with blue-green. Further, the light-emitting control unit 202 makes the third light-emitting part 125*c* (disposed in a range of between 45° to) 75°, which is next to the second light-emitting part 125*b*, emit light with blue-green, makes the fourth light-emitting part 125*d* (disposed in a range of between 75° to 105°), which is next to the third light-emitting part 125*c*, emit light with blue, . . . , and makes the first light-emitting part 125*a* (disposed in a range of between 345° to 360°, and between 0° to 15°), which is next to the second light-emitting part 125*b* counterclockwise, emit light with green.

If people who can coexist with the moving robot 100 recognize the definition of the luminous colors shown in FIG. 4, they can immediately recognize the moving direction by visually recognizing the luminous color emitted from the moving robot 100 moving nearby. For example, even when the moving robot 100 moves under a dim environment, people in a surrounding area can recognize the movement operation in which the moving robot 100 approaches or moves away merely by recognizing the luminous color emitted from the moving robot 100. Further, the light emitting parts of the light emitting unit 125 are disposed at equal intervals on the annular outer peripheral part of the upper part of the main unit 120 so that people in the surrounding area can recognize the moving direction of the moving robot 100 regardless of their standing positions. That is, although the luminous color to be visually recognized is varied depending on the standing positions of the people in the surrounding area, if the people in the surrounding area have recognized which direction with respect to the moving direction the luminous color that they visually recognized is defined, they can immediately recognize the moving direction of the moving robot 100. Further, each of the light emitting parts can be composed of a simple unit such as a three-color LED so that the above-described light emitting control can be achieved easily and at low cost.

Figure 5:
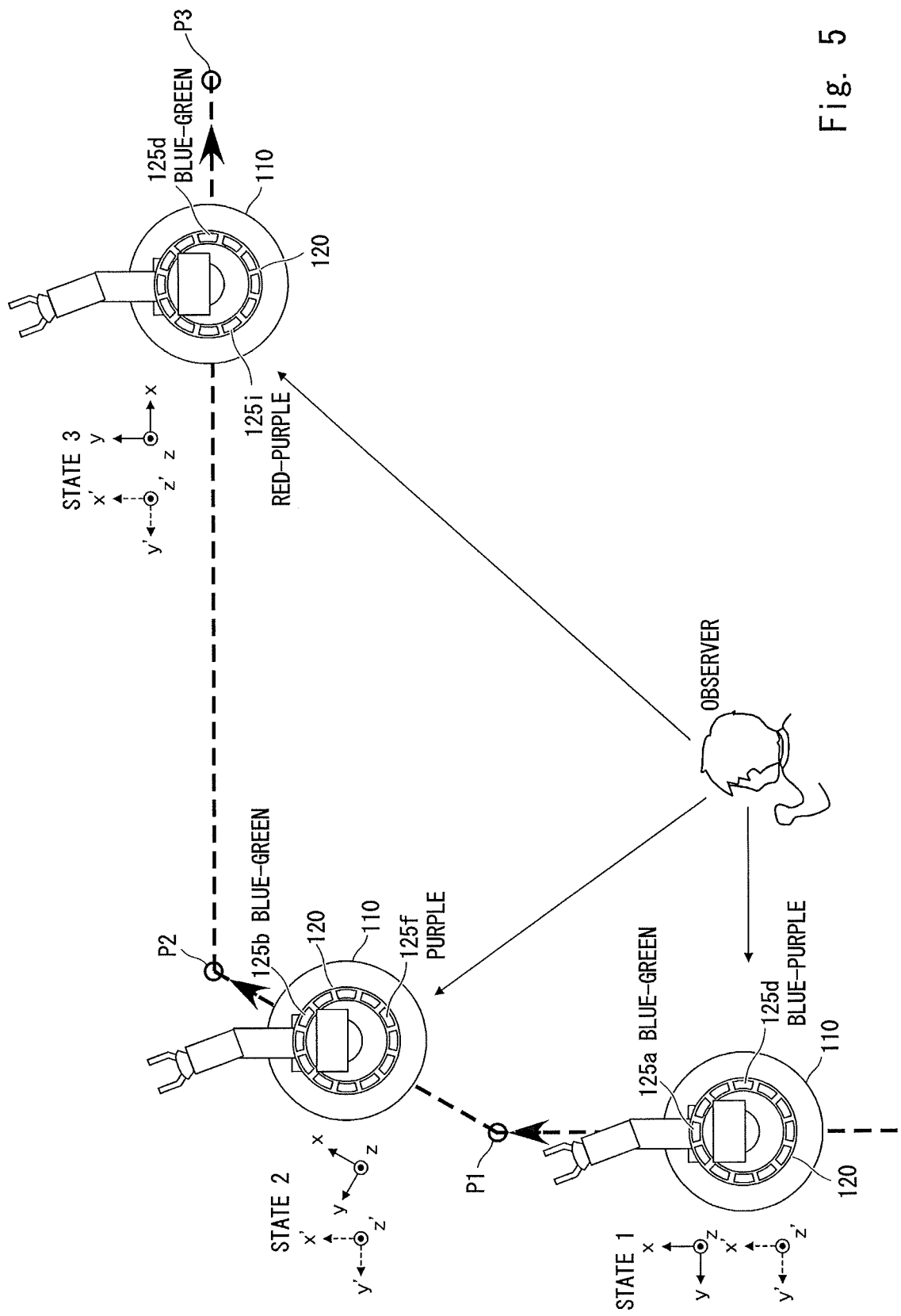
FIG. 5 is a diagram for explaining a state where the moving robot moves.

The operation is described more specifically. FIG. 5 is a diagram for explaining a state where the moving robot 100 moves. Specifically, FIG. 5 shows, among states of the moving robot 100 moving along the dotted line, a state 1 at a certain point of time until the robot moves toward a change point P1, a state 2 at a certain point of time until the robot moves toward a change point P2 after changing its direction at the change point P1, and a state 3 at a certain point of time until the robot moves toward a destination P3 after changing its direction at the change point P2. Further, as shown in FIG. 5, it is assumed that the observers who observe the moving robot 100 are at a position some distance away from the right side with respect to the moving direction of the moving robot 100 in the state 1.

In the moving robot 100 in the state 1, the x-axis positive direction which is the moving direction of the carriage unit 110 and the x'-axis positive direction which is the front direction of the main unit 120 coincide with each other. At this time, the light-emitting control unit 202 makes the first light-emitting part 125a, which is positioned at the front with respect to the moving direction, emit light with blue-green, and with reference to the first light emitting part 125a, the light-emitting control unit 202 makes each of the light emitting parts emits light in accordance with the definition of the luminous colors shown in FIG. 4.

When the light-emitting control unit 202 makes each of the light emitting parts emits light in such a manner, the observers observe that the fourth light-emitting part 125d, which is the easiest to visually recognize in the state 1, emits light with blue-purple. When the observers have recognized that the "blue-purple" indicates a direction rotated clockwise by 90° with respect to the moving direction, they can recognize at a glance that the moving robot 100 moves in the right direction as viewed from them. Even when the observers have not correctly recognized a direction which the "blue-purple" indicates, they can recognize at a glance that the moving robot 100 moves in the approximate right direction as viewed from them as long as they have recognized that bluish colors indicate the right side direction with respect to the moving direction.

Although the moving robot 100 can adjust a posture of the main unit 120 during moving according to conditions of an object to be transferred and a moving path, or the like, it is assumed here that a posture of the main unit 120 is maintained due to restriction on an object to be transferred. At the change point P1, the moving robot 100 changes the moving direction of the carriage unit 110 toward the change point P2 to continue moving while maintaining the posture of the main unit 120. In the moving robot 100 during this period, the x'-axis positive direction which is the front direction of the main unit 120 is shifted counterclockwise by 30° from the x-positive direction which is the moving direction of the carriage unit 110. Accordingly, while the moving robot 100 moves from the change point P1 to the change point P2, the light-emitting control unit 202 makes the second light-emitting part 125b, which is positioned at the front with respect to the moving direction, emit light with blue-green, and with reference to the second light emitting part 125b, the light-emitting control unit 202 makes each of the light emitting parts in accordance with the definition of the luminous colors shown in FIG. 4.

When the light-emitting control unit 202 makes each of the light emitting parts emits light in such a manner, the observers observe that the sixth light-emitting part 125f, which is the easiest to visually recognize in the state 2, emits light with blue-purple. When the observers have recognized that the "purple" indicates a direction rotated clockwise by 120° with respect to the moving direction, they can recognize at a glance that the moving robot 100 moves backward in a direction oblique to a direction visually recognized.

At the change point P2, the moving robot 100 changes the moving direction of the carriage unit 110 toward the destination P3 to continue moving while maintaining the posture of the main unit 120. In the moving robot 100 during this period, the x'-axis positive direction which is the front direction of the main unit 120 is shifted counterclockwise by 90° from the x-positive direction which is the moving direction of the carriage unit 110. Accordingly, while the moving robot 100 moves from the change point P2 to the destination P3, the light-emitting control unit 202 makes the fourth light-emitting part 125d, which is positioned at the front with respect to the moving direction, emit light with blue-green, and with reference to the fourth light-emitting part 125d, the light-emitting control unit 202 makes each of the light emitting parts in accordance with the definition of the luminous colors shown in FIG. 4.

When the light-emitting control unit 202 makes each of the light emitting parts emits light in such a manner, the observers observe that the ninth light-emitting part 125i, which is the easiest to visually recognize in the state 3, emits light with blue-purple. When the observers have recognized that "red-purple" indicates a direction rotated clockwise by 150° with respect to the moving direction, they can recognize at a glance that the moving robot 100 moves backward in a direction oblique to the direction in which they visually recognize. When it is assumed that the observers have continuously observed that the moving robot 100 moves from the change point P2 to the destination P3, they visually respectively recognize that the sixth light-emitting part 125f emits light with blue, the seventh light-emitting part 125g emits light with blue-purple, the eighth light-emitting part 125h emits light with purple, and the ninth light-emitting part 125i emits light with red-purple. At any time, the observers can immediately recognize the moving direction of the moving robot 100 by the visually-recognized luminous color.

Unlike a moving body in which a traveling direction thereof can be assumed from the outer shape such as automobiles, it is generally difficult for observers to conceive a moving direction of a moving body capable of changing a posture of the upper part with respect to the moving direction, and moving in all directions without changing the posture of the upper part. However, like the moving robot 100 according to this embodiment, as long as a light emitting unit which emits light with the luminous colors defined with respect to the moving direction regardless of the posture of the upper part is provided, the surrounding observers can immediately recognize the moving direction.

In the control example shown in FIG. 5, although the posture of the main unit 120 is not changed during moving of the moving robot 100, in the case where the posture of the main unit 120 is changed during moving of the moving robot 100, the light-emitting control unit 202 successively acquires and determines the moving direction of the carriage unit 110 and the posture of the main unit 120 to update the colors of each of the light emitting parts. Even when the posture of the main unit 120 is maintained, in the case where the carriage unit 110 moves along a serpentine path, the light-emitting control unit 202 similarly successively acquires and determines the moving direction of the carriage unit 110 and the posture of the main unit 120 to update the colors of each of the light emitting parts.

The light-emitting control unit 202 may determine a moving speed of the carriage unit 110 by a drive signal transmitted to the carriage drive unit 210 by the control unit 200, or a feedback signal returned from the carriage drive unit 210 to the control unit 200 to superimpose the moving speed information onto light emission of the light emitting parts. For example, although the color order of the hue circle is used for the definition of the luminous colors with respect to the moving direction, which is described with reference to FIG. 4, at least one of changes of saturation and brightness of the luminous colors is used for presenting the moving speed information. For example, as the moving speed becomes faster, the color is made to be clear or bright continuously or in a stepwise manner. On the other hand, as the moving speed becomes slower, the color is made to be unclear or dark continuously or in a stepwise manner. With such an adjustment of the luminous colors, the observers can immediately recognize not only the moving direction of the moving robot 100, but also the approximate speed thereof.

Further, although the light emitting unit 125 includes twelve light emitting parts, the number of the same is not limited to twelve. When more light emitting parts are disposed, it is possible to make the change of the hue smoother. For example, an LCD or the like may be disposed over 360° along the annular outer peripheral part of the main unit 120. On the contrary, when a small number of light emitting parts are disposed, it is preferred that they be disposed so as to correspond to at least four directions, which are a moving direction, a direction opposite to the moving direction, a right side direction with respect to the moving direction, and a left side direction with respect to the moving direction. In this case, it is preferred that an angle of an irradiation lens be set closer to a wide angle so that at least one of light emissions of four light emitting parts can be visually recognized regardless of standing positions of the observers, and so that the light emissions are diffused over a wider range than in the case where more light emitting parts are disposed. In this case, the luminous colors with respect to the moving direction are so defined that a first specified color associated with the moving direction, a second specified color associated with a direction opposite to the moving direction, a third specified color associated with the right side direction with respect to the moving direction, and a fourth specified color associated with the left side direction with respect to the moving direction are included.

As described above, regarding the light emitting unit 125 as a light emitting device, the light emitting parts thereof may be disposed on the moving robot 100 so that the observers in a moving plane where the moving robot 100 moves can recognize at least one of the luminous colors at any observation position. In other words, it is preferred that the light emitting unit 125 be installed so that at least one of the light emitting parts can emit light with the luminous colors according to the moving direction within an arbitrary range of 180 degrees in the radial directions. As long as the adjacent light emitting parts are respectively disposed along the outer peripheral part at intervals so that a central angle centered around the z'-axis is within 180 degrees, the observers can recognize at least one of the luminous colors at any standing position.

Next, several examples having a different configuration of the light emitting unit 125 are described. The overall configuration and the definition of the luminous colors of the moving robot 100 according to the first example are basically common to any of the examples, and thus the differences are described in particular. The same configurations are denoted by the same reference numbers in the figures, and the descriptions thereof are omitted.

Figure 6:
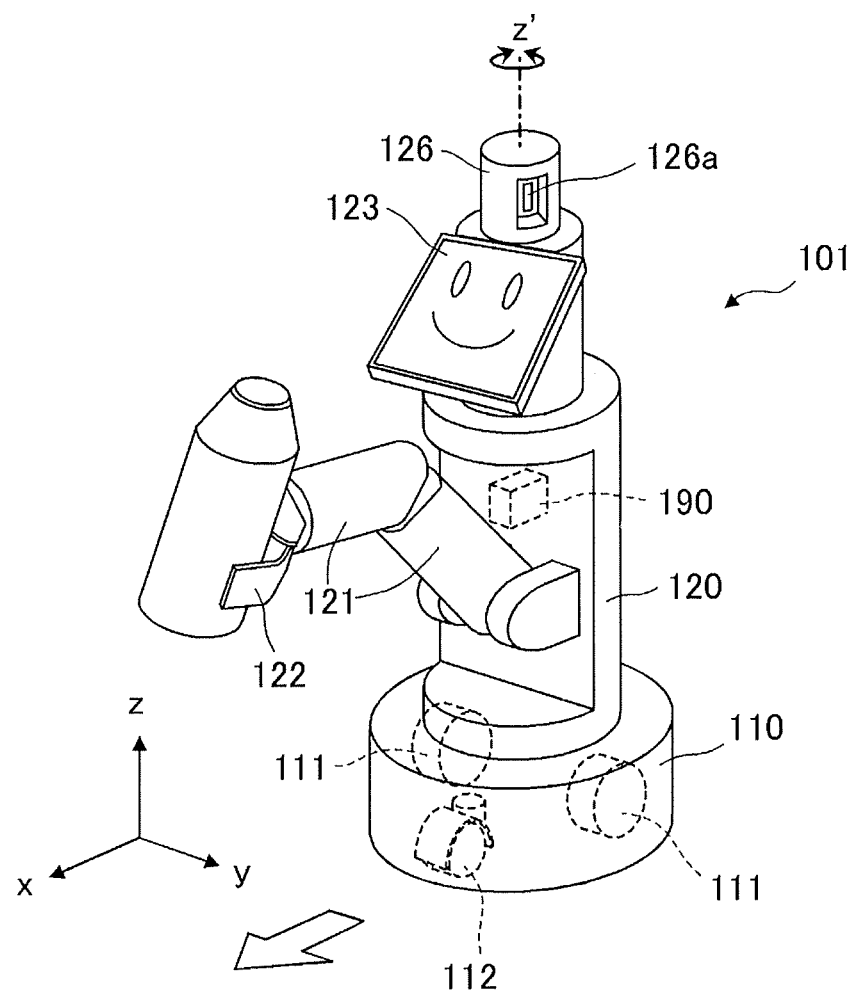
FIG. 6 is an external perspective view showing a moving robot according to a second example in the embodiment.

FIG. 6 is an external perspective view showing a moving robot 101 according to a second example in this embodiment. The moving robot 101 includes a rotary light-emitting unit 126 instead of a light emitting unit 125 constituted by a plurality of light emitting parts. The rotary light-emitting unit 126 is installed at the top of the head part to which the display panel 123 is attached.

The rotary light-emitting unit 126 includes a light emitting part 126a capable of adjusting the luminous colors, and a driving device (not shown) for rotating around z'-axis with respect to the main unit 120. The light-emitting control unit 202 drives that driving device to successively direct light from the light emitting unit 126a toward the radial directions. Further, the light-emitting control unit 202 determines the luminous color of the light emitting unit 126a in accordance with the definition of the luminous colors corresponding to the moving direction shown in FIG. 4. For example, the light-emitting control unit 202 makes the light emitting part 126a emit light with blue-green when directing the light emitting unit 126a toward the moving direction, and it makes the light emitting part 126a emit light with blue-purple when directing the light emitting part 126a toward the right side direction. In such a manner, even by interlocking the rotation of the light emitting part 126a and the change of the luminous colors according to the moving direction of the carriage unit 110, the surrounding observers can immediately recognize the moving direction of the moving robot 101.

Figure 7:
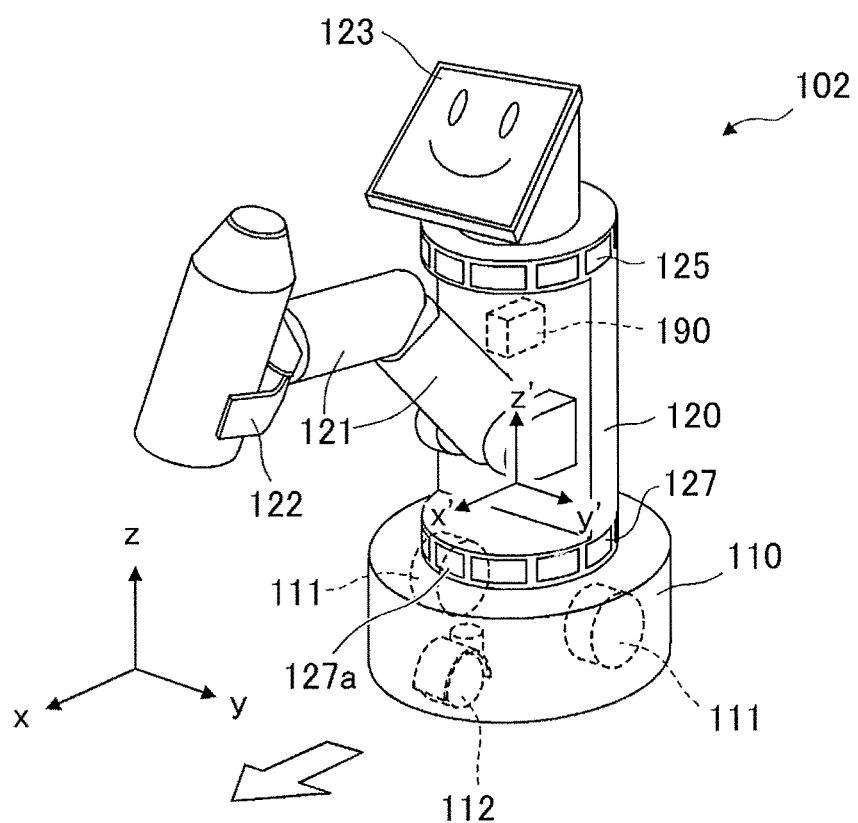
FIG. 7 is an external perspective view showing a moving robot according to a third example in the embodiment.

FIG. 7 is an external perspective view showing a moving robot 102 according to a third example in this embodiment. The moving robot 102 further includes a secondary light-emitting unit 127 in addition to the configuration of the moving robot 100 according to the first example. The secondary light-emitting unit 127 is installed in the annular outer peripheral part of the lower part of the main unit 120, and has a configuration same as that of the light emitting unit 125. The light-emitting control unit 202 performs light-emitting control of the secondary light emitting unit 127 together with the light emitting unit 125.

The light-emitting control unit 202 makes the secondary light-emitting unit 127 emit light when the carriage unit 110 is not moving, that is, the moving robot 102 is at a standstill. Specifically, with reference to the posture of the main unit 120, the light-emitting control unit 202 makes the secondary light-emitting unit 127 emit light in accordance with the definition of the luminous colors with respect to the moving direction shown in FIG. 4. More specifically, the light-emitting control unit 202 makes a first light-emitting part 127a, which is located in the x'-axis positive direction, emit light with blue-green. Then, it makes the remaining light emitting parts emit light with the respective luminous colors corresponding thereto. The light-emitting control unit 202 does not make the light emitting unit 125 emit light when the moving robot 102 is at a standstill. Conversely, when the moving robot 102 is moving, it does not make the secondary light-emitting unit 127 emit light.

Note that in the moving robot 102, the secondary light-emitting unit 127 is installed in the main body 120, and thereby a relative positional relation between the posture around the z'-axis of the main body 120 and each of the light emitting parts of the secondary light-emitting unit 127 remains unchanged. Accordingly, each of the light emitting parts always emits light with the same luminous color when emitting light. However, when the secondary light-emitting unit 127 is installed so that the relative positional relation between the posture around the z'-axis of the main body 120 and each of the light emitting parts of the secondary light-emitting unit 127 is changed, the light-emitting control unit 202 determines the luminous colors of each of the light emitting parts according to the relative change and makes the secondary light-emitting unit 127 emit light.

When the secondary light-emitting unit 127 is made to emit light in such a manner, the surrounding observers recognize the luminous color of the hue circle with respect to the posture of the moving robot 102 facing the front direction which is assumed from, for example, a direction of a dummy head or a position at which an arm is attached. Then, when the moving robot 102 moves, the surrounding observers conceptually recognize the "moving direction" as the "front" which is common to the "front direction". Accordingly, it becomes easy for them to understand intuitively that which direction the luminous color that they are visually recognizing indicates with respect to the moving direction of the moving body. That is, the observers come to recognize the definition of the luminous colors shown in FIG. 4 without being much conscious thereof by observing the moving robot 102 whenever it is moving or at a standstill.

In the case of switching the light emission between the light emitting unit 125 and the secondary light-emitting unit 127 when the moving robot 102 starts to move from a standstill or when it comes to a standstill after finishing moving, the light-emitting control unit 202 may set a period during which both the light emitting unit 125 and the secondary light-emitting unit 127 emit light at the time of switching. When such light-emitting control is performed, the surrounding observers can easily recognize whether the moving robot 102 which is moving comes to a standstill, or the moving robot 102 which is at a standstill starts to move.

Note that although two light emitting devices which are the light emitting unit 125 and the secondary light emitting unit 127 are included in the moving robot 102, in the moving robot 100 according to the first example, the single light emitting unit 125 may be used for performing light-emitting control in accordance with the posture direction of the moving robot 100 at a standstill. In the case where a moving direction of the moving robot 100 when it is moving and a front direction of the moving robot 100 when it is at a standstill are represented by using a single light emitting unit, the light-emitting control unit 202 preferably causes there to be a difference between at least one of saturation and brightness when the moving robot 100 is moving and that when the moving robot 100 is at a standstill.

Figure 8:
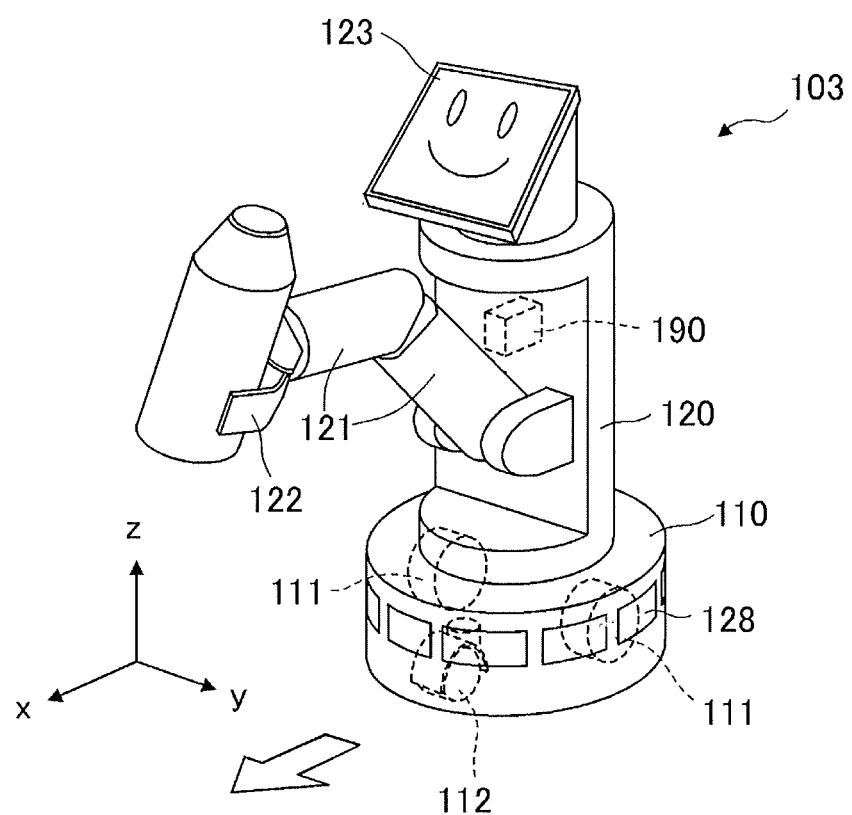
FIG. 8 is an external perspective view showing a moving robot according to a fourth example in the embodiment.

FIG. 8 is an external perspective view showing a moving robot 103 according to a fourth example in this embodiment. Although the moving robot 100 according to the first example includes the light emitting unit 125 in an annular outer peripheral part of the upper part of the main unit 120, the moving robot 103 includes a light emitting unit 128 similar to the light emitting unit 125 in an annular outer peripheral part of the carriage unit 110. When the light emitting unit 128 is provided in the carriage unit 110 in such a manner, the light-emitting control unit 202 can determine the luminous colors of the light emitting parts without determining the posture of the main unit 120. Therefore, with a simpler configuration, the surrounding observers can recognize the moving direction of the moving robot 103.

From the disclosure thus described, it will be obvious that the embodiments of the disclosure may be varied in many ways. Such variations are not to be regarded as a departure from the spirit and scope of the disclosure, and all such modifications as would be obvious to one skilled in the art are intended for inclusion within the scope of the following claims.

What is claimed is:

1. A moving body configured to move autonomously, comprising:
   a light emitting device configured to emit light in radial directions with respect to a vertical axis of the moving body;
   an acquisition unit configured to acquire a moving direction of the moving body; and
   a light-emitting control unit configured to make the light emitting device emit light with luminous colors previously associated with each direction of the radial directions with reference to the moving direction acquired by the acquisition unit, wherein
   the light emitting device is installed so as to be able to emit light with at least one of the luminous colors within an arbitrary range of 180° in the radial directions.

2. The moving body according to claim 1, wherein the light emitting device includes a plurality of light emitting parts, and each of the plurality of light emitting parts is disposed in an outer peripheral part of the moving body.

3. The moving body according to claim 1, wherein the light emitting device includes a light emitting part, and a driving device configured to successively direct light from the light emitting part toward the radial directions.

4. The moving body according to claim 1, wherein the luminous colors include at least: a first specified color associated with the moving direction; a second specified color associated with a direction opposite to the moving direction; a third specified color associated with a right side direction with respect to the moving direction; and a fourth specified color associated with a left side direction with respect to the moving direction.

5. The moving body according to claim 1, wherein the acquisition unit also acquires a moving speed of the moving body, and the light-emitting control unit changes at least one of saturation and brightness of the luminous colors according to the moving speed acquired by the acquisition unit.

6. The moving body according to claim 1, wherein when the moving body is at a standstill, the light-emitting control unit makes the light emitting device emit light with the luminous colors with reference to a posture of the moving body.

7. The moving body according to claim 1, wherein the light emitting device includes a first light-emitting device and a second light-emitting device, and
   when the moving body is moving, the light-emitting control unit makes the first light-emitting device emit light with luminous colors previously associated with each direction of the radial directions with respect to the moving direction acquired by the acquisition unit, and
   when the moving body is at a standstill, the light-emitting control unit makes the second light-emitting device emit light with the luminous colors with respect to the posture of the moving body.

8. The moving body according to claim 7, wherein when light emission between the first light-emitting device and the second light-emitting device is switched, the light-emitting control unit sets a period during which both of the devices emit light at the time of switching.

\* \* \* \* \*